United States Patent [19]
Prom

[11] Patent Number: 6,062,866
[45] Date of Patent: May 16, 2000

[54] MEDICAL ANGIOPLASTY MODEL

[76] Inventor: James M. Prom, 1567 Bluebird La., Mound, Minn. 55364

[21] Appl. No.: 09/276,333

[22] Filed: Mar. 25, 1999

Related U.S. Application Data

[60] Provisional application No. 60/079,646, Mar. 27, 1998.
[51] Int. Cl.⁷ .................................................. G09B 23/28
[52] U.S. Cl. .......................... 434/268; 434/262; 434/272
[58] Field of Search .................................... 434/262, 268, 434/272

[56] References Cited

U.S. PATENT DOCUMENTS

| | | | |
|---|---|---|---|
| 5,634,797 | 6/1997 | Montgomery | 434/268 |
| 5,908,302 | 6/1999 | Goldfarb | 434/262 |

*Primary Examiner*—Sam Rimell
*Attorney, Agent, or Firm*—Gregory J. Nelson

[57] ABSTRACT

A medical model for teaching and demonstrating invasive medical procedures such as angioplasty. The model is a plastic, transparent three-dimensional, anatomically correct representation of at least a portion of the vascular system and in a preferred embodiment would include the aorta, coronary artery, subclavian arteries, pulmonary artery and renal arteries each defining a passageway or lumen. An access port is provided so that actual medical devices, such as a guide and catheter may be inserted to the location simulated blockage. Fluid may also be introduced to realistically simulate in vivo conditions. Simulated heart chambers of similar construction may also be attached to the aortic valve to further enhance the representation of invasive procedures.

9 Claims, 2 Drawing Sheets

MEDICAL ANGIOPLASTY MODEL

CROSS REFERENCE TO RELATED APPLICATION

This application is based on Provisional Patent Application Ser. No. 60/079,646, filed Mar. 27, 1998 entitled "Angioplasty Model".

FIELD OF THE INVENTION

The present invention relates to a medical model or mannequin and more particularly relates to an anatomical model of at least a part of the vascular structure and heart which may be used for teaching and demonstrating medical procedures such as angioplasty.

BACKGROUND OF THE INVENTION

The use of models or mannequins for teaching anatomy and medical procedures is well known. A survey of the prior art indicates the following patents relate to the field of educational medical simulator devices:

U.S. Pat. No. 5,314,339 shows an educational medical mannequin comprising a head, neck, torso, arms and legs. The various forms of the mannequin include in various combinations, a tracheostomy opening, injection zones, a feeding tube, stoma catheter openings, decubitus site, a breathing sound generator and other features which may be used in combination with devices such as IV assemblies, catheters and hypodermic syringes to train medical personnel in various medical procedures.

U.S. Pat. No. 5,518,406 shows a model of a human abdominal wall for use in demonstrating or practicing the use and maintenance of per cutaneous endoscopic gastrostomy tubes. The model incorporates two or more layers bound together. The top layer approximates the feel and texture of human skin. The second layer approximates the feel and resistance of the subcutaneous tissues in the human abdominal wall. A third layer may be added approximating the feel and resistance of human stomach tissues. Openings are provided which pass completely through the model to accommodate placement of per cutaneous endoscopic gastrostomy tubes.

A mock circulation system is shown in U.S. Pat. No. 5,632,623. The system includes a collapsible housing having a plurality of channels formed to represent the arteries, veins and organs of the human circulatory system. A pair of artificial ventricles are connected to the housing to pump fluid through the housing so as to develop circulation. By using a plurality of flow restricting devices and by modifying the pumping of the artificial ventricles, a variety of circulatory conditions, both healthy and pathogenic, can be simulated. Cardiac massage may be demonstrated by manually squeezing the artificial ventricles.

U.S. Pat. No. 5,620,326 discloses an anatomical simulator system which includes a synthetic torso resting on a base. The torso includes an internal cavity. A selective one of a variety of procedure packs may be placed in the cavity for use in training in video endoscopic surgical techniques. The torso has a plurality of trocar apertures which permit insertion of video endoscopic instruments for manipulation, incision, dissection and suturing. Each procedure packet includes a simulated anatomical structure.

U.S. Pat. No. 4,773,865 discloses a training mannequin which exhibits many of the tactile sensations of a human body. The mannequin includes an anatomically correct skeleton including a skull,jawbone, and spinal column. An anatomically correct larynx and associated trachea are disposed in the throat cavity. Plastic skin covers the mannequin and an inflatable member is disposed in a chest cavity. The inflatable member substantially fills the chest cavity by means of an air pump. A student can insert a sharp instrument, such as a needle, through the skin and into the larynx or between the ribs to deflate the member. A source of simulated blood is fluidly connected to the femoral veins as well as external jugular adjacent the larynx.

Several patents can be found in the prior art for teaching or demonstrating intra vascular procedures. U.S. Pat. No. 4,726,772 discloses a medical simulator for enabling demonstrating, trial and test insertion of torqueable elongated members into small body passages that branch from main passages. The members may be guide wires or catheters which are constructed so that the tip will turn and twist in response to corresponding motion applied by the operator at the proximal end of the device.

U.S. Pat. No. 5,112,228 shows an anatomical model for testing or demonstrating intra vascular devices such as guide wires and dilation catheters for angioplasty procedures. The model has a plurality of interconnecting passageways simulating the abdominal aorta and renal arteries as well as the left and right iliac and femoral arteries with one or more entry ports therein for introduction and advancement of intra vascular devices into the interconnected passageways.

While a review of the foregoing indicates there are various anatomical models for testing and teaching medical procedures in the prior art, none are three-dimensional representations of the vascular anatomy which are accurate anatomical models providing full visualization simulating realistic in vivo conditions.

BRIEF SUMMARY OF THE INVENTION

Briefly, the present invention is an angioplasty model which serves as a teaching device for medical students and medical personnel. The model also is a testing device for invasive transluminal devices. The angioplasty model includes simulated heart chambers which may contain water or other fluid. The model is constructed from transparent material such as plastic which simulates vascular anatomy and which in a preferred embodiment includes the aorta and other arteries, such as the right and left coronary arteries, right subclavian and left subclavian arteries, right and left renal arteries and right and left iliac arteries. Simulated blockages may be inserted by placing obstructions such as annuli at various locations within the vascular anatomy to simulate various medical conditions which may occur. A balloon pump may be inserted into the model to simulate pulsitile flow as occurs in the body. Other therapy such as IV drip therapy systems may be attached to the model at ports provided for this purpose.

The model is structured in appearance and size to closely simulate the anatomy of the vascular system in a human. The model may include veins and a complete circulation system may be obtained by interconnecting the models of the venous and arterial systems. The various veins and arteries are fabricated from clear plastic such as a thin wall polycarbonate or PVC which define a lumen through which the simulated blood flow occurs. In this way, complete visualization is provided and when the device is filled with fluid simulates in vivo conditions. Complete transparency is provided so that when used to teach invasive procedures such as catheterization, 270° visibility is provided in one plane and 60° on the other as occurs in actual procedures. Realistic conditions are thus provided for demonstrating and rehearsing various invasive transluminal procedures.

BRIEF DESCRIPTION OF THE DRAWINGS

The above and other objects and advantages will become more apparent from the following description, claims and drawings in which:

Figure 1:
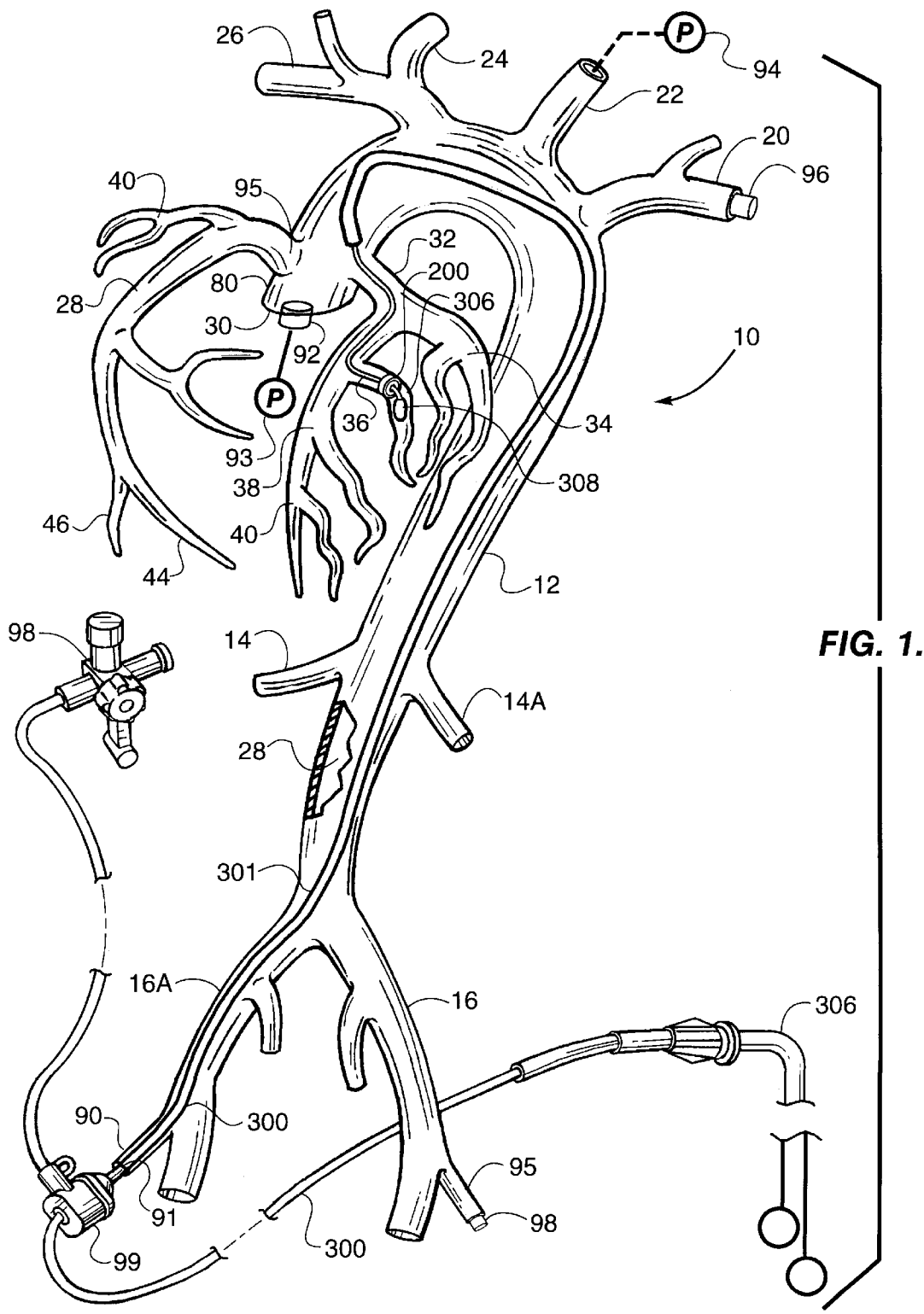
FIG. 1 is a perspective view of the medical model of the present invention showing the vascular system with a catheter shown inserted into the system model.

The vascular system of the medical model of the present invention is shown in FIG. 1 and is generally designated by the numeral 10. The model comprises a portion of the circulatory system including either selected veins or arteries, or both. As shown, the model is a simulation of a portion of the arterial system including the aorta 12 which is intersected by the right and left renal arteries 14 and 14A. The lower end of the aorta splits at the right and left iliac arteries 16A and 16. The upper end of the aorta forms a general U-configuration as exists in the human body from which extends the left subclavian artery 20, the right and left carotid arteries 24 and 22, and the right subclavian artery 26. The right coronary artery 28 is connected to the aorta proximal to the aortic valve 30. The left main artery 32 also extends from adjacent the aortic valve and is connected to the circumflex femoral artery 34. A series of diagonal arteries 36,38 and 40 also extend from the left main artery. The right coronary artery 28 may also include the SA40, RV42, PDA44 and PL46. The various portions of the circulatory system described above define internal passageways or lumens which terminate at the extremities such as at the ends of the arteries 20, 22, 24 and 26.

The circulatory system including the principal arteries described is representative of a preferred embodiment of the model. The model may also be constructed using a portion of the venous system including, for example, the superior vena cava, pulmonary vein, subclavian vein and others. The venous and arterial system may be interconnected for a more complete circulatory system. Generally for demonstrating angioplasty procedures the components of the arterial system as shown in FIG. 1 are utilized. However, other veins and arteries may also be included as required for the particular teaching technique.

The model is fabricated from a suitable transparent, semi-rigid tubing material. One material suitable for this purpose is a thin wall polycarbonate and other suitable materials include PeTe and PVC. The material should have sufficient transparency so that the lumens such as within the various veins and arteries is fully visible from all positions. Self-support is also a requirement and the material typically would have a wall thickness of approximately from 1 to 6 mils with 2 mils being acceptable for most applications. Further, the various veins and arteries are preferably sized in accordance with their dimensional relationships as exist in the human body with the aorta typically have the greatest diameter.

The model may be filled with a suitable fluid such as water to simulate static in vivo conditions. The fluid may be clear or colored to better simulate actual conditions within the body and fluid may be administered by an IV which is connected to the system at port 90 in the right iliac. A pump such as an intra aortic balloon pump 93, can be inserted into the model at a location such as port 80 and advanced to the descending aortic to simulate blood flow by providing a pulsitile wave. Also, a pump 94 such as a peristaltic pump as used in open heart surgery, may be connected to the model 10 at the left carotid 22 to impart a realistic pulsatile action to the model. An outlet port 95 can be provided in the model such as at the left iliac port to allow the fluid to exit the model. Ports may be provided at various convenient locations in the model and covered by a closure 98 when not in use. A stopcock 98 is shown connected at connector 99 to realistically represent the devices used in invasive procedures.

Figure 2:
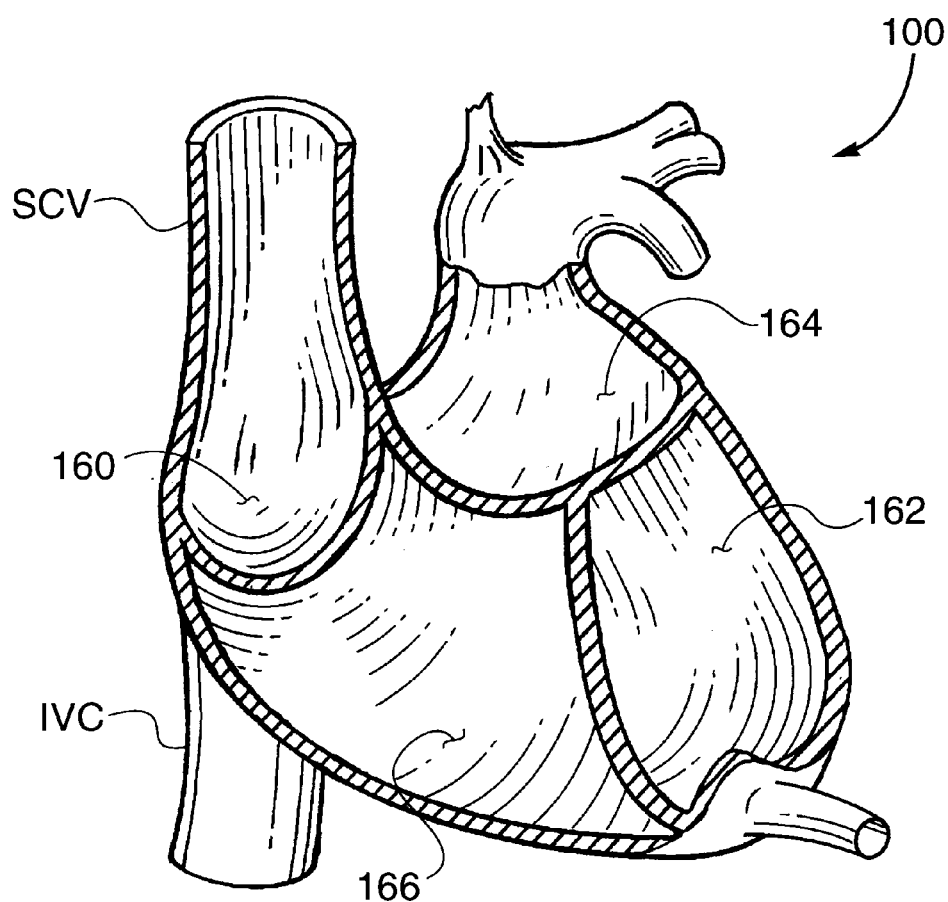
FIG. 2 is an anterior view of simulated heart chambers which may be attached to the vascular system shown in FIG. 1.

To further enhance the model's representation of invasive diagnosis and intervention, simulated heart chambers may also be connected to model 10 at the connector 92 at the aortic valve 30. The simulated heart chambers 100 shown in FIG. 2 includes the main heart chamber including right atrium 160, left atrium 164, left ventricle 162 and right ventricle 166. Preferably the simulated heart chambers 100 are fabricated from a translucent or transparent, rigid or semi-rigid material such as polycarbonate or PVC. Other parts of the heart such as the superior vena cava (SVC) and the inferior vena cava (IVC) may be incorporated in the heart chamber model 100 for demonstrative purposes. The model may be fabricated in various ways such as forming and joining tubing sections, by blow molding or by more advanced computer methods such as stereo lithography.

The simulated heart chambers are connected to the vascular model 10 at the aortic valve by a connector such as a section of tubing 180 extending from the left ventricle 162 of the heart to the aorta of the model 100.

Figure 3:
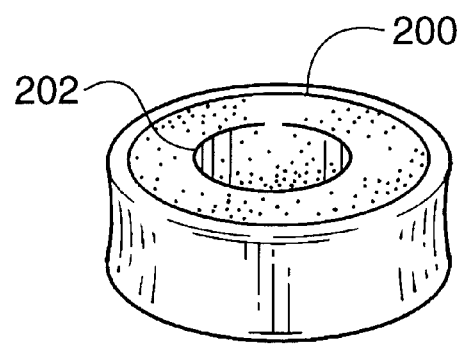
FIG. 3 is a perspective view of a simulated blockage element.

A significant advantage of the angioplasty model of the present invention is that it provides complete visibility of the various vessels and organs from all sides. The device may be filled with a fluid to simulate blood flow. In use, a blockage would be simulated at a location such as by insertion of a lesion 200 as seen in FIG. 3. The lesion element is annular having a lumen 202 of reduced diameter and can be inserted by a catheter transluminally to the desired location. Alternatively, an obstruction could be simulated by pinching the model in an area to occlude or partially occlude the lumen.

Thus, invasive transluminal procedures such as angioplasty can be practiced on the model, as for example, by inserting an invasive device such as a wire or catheter 300 with the aid of a sheath 301 into the model at a location such as at a port 90 located at the right femoral artery 91. The medical practitioner can then guide the catheter up the aorta, around the arch and to the entrance to the coronary vessels at 95. A smaller wire 308 and a balloon 306 are advanced through the catheter into the coronary arteries to an environment similar to the actual anatomical environment in which these procedures are performed. The angioplasty model provides visualization of more than 270° on one plane and more than 60° on the other, compatible with standard angioplasty camera viewing angles. This is important because incorrect positioning of a catheter or wire can result in severe injury or even death of the patient. The model is self-supporting and may be placed on a convenient examination surface.

From the foregoing, it will be apparent that the angioplasty model provides medical personnel with hands-on experience in a risk-free environment to teach medical procedures. The angioplasty model mannequin is a realistic representation of at least a part of the circulatory system and may be attached to a model of the human heart. This allows the medical students and practitioners to become familiar with angioplasty procedures without jeopardizing the safety of actual patients. Users of the present invention can experiment and become familiar with the use and effectiveness of various types of invasive devices such as wire and balloon catheters, stents and athrectomy catheters. In addition, the model can be set up at the time of use to simulate various medical conditions and blockages that may occur in the human body which better prepares medical practitioners to perform actual angioplasty procedures quickly and effectively. The present invention will serve to improve the quality of angioplasty procedures both as to the skill of the medical practitioner and the quality of devices used in such procedures such as balloon catheters.

While the principles of the invention have been made clear in the illustrative embodiments set forth above, it will be obvious to those skilled in the art to make various modifications to the structure, arrangement, proportion, elements, materials and components used in the practice of the invention. To the extent that these various modifications do not depart from the spirit and scope of the appended claims, they are intended to be encompassed therein.

I claim:

1. A medical model for demonstrating and practicing various invasive transluminal procedures, said model comprising:

(a) a three-dimensional section having an upper ascending aortic end, an aortic arch, a descending aortic section, said descending aortic section separating at a lower end into first and second branches, at least one of said branches defining a port for insertion of an invasive member; and (b) said section being sized and configured to conform to the human anatomy, said section being generally transparent and defining a lumen whereby said procedures can be performed by inserting an invasive in said port and guiding it through said lumen while observing its progress.

2. The medical model of claim 1 further including a simulated blockage means insertable in said vascular system.

3. The medical model of claim 1 wherein said passageways are self-supporting having a wall thickness from about 1 to 6 mils.

4. The medical model of claim 1 wherein said passageways are fabricated from plastic by blow molding.

5. The medical model of claim 1 further including additional vasculature features connected thereto.

6. The medical model of claim 1 further including a second port for connection to a pump to allow the lumens to be filled with a fluid simulating in vivo conditions.

7. The medical model of claim 1 further including simulated hearing chambers connectable to the section.

8. The model of claim 1 further including additional vascular arteries extending from said three-dimensional section including at least the right and left coronary arteries, and the left and right subclavian arteries.

9. The model of claim 1 wherein said first and second branches simulate the right and left iliac arteries.

* * * * *